United States Patent [19]

Smith

[11] Patent Number: 5,128,780
[45] Date of Patent: Jul. 7, 1992

[54] ENHANCED-RESOLUTION, MULTIPLY-EXPOSED REFLECTION HOLOGRAM

[75] Inventor: Ronald T. Smith, Redondo Beach, Calif.

[73] Assignee: Hughes Aircraft Company, Los Angeles, Calif.

[21] Appl. No.: 401,262

[22] Filed: Aug. 30, 1989

[51] Int. Cl.$^5$ .......................... G02B 1/30; G02B 1/08; G02B 27/00
[52] U.S. Cl. .......................................... 359/24; 359/9; 359/900
[58] Field of Search ..................... 350/3.77, 3.82, 174, 350/320, 3.6–3.81; 359/1–35, 900

[56] References Cited

U.S. PATENT DOCUMENTS

| | | | |
|---|---|---|---|
| 4,094,575 | 6/1978 | Kellie | 350/3.77 |
| 4,099,971 | 7/1978 | Graube | 350/3.61 |
| 4,603,938 | 8/1986 | Kojima et al. | 350/3.72 |
| 4,655,540 | 4/1987 | Wood et al. | 350/174 |
| 4,799,746 | 1/1989 | Wreede | 350/320 |
| 4,839,250 | 6/1989 | Cowan | 350/3.65 |
| 4,915,464 | 4/1990 | Hopwood | 350/3.75 |
| 4,930,847 | 6/1990 | Cederquist | 350/3.6 |

Primary Examiner—Bruce Y. Arnold
Assistant Examiner—Thong Nguyen
Attorney, Agent, or Firm—Leonard A. Alkov; Wanda K. Denson-Low

[57] ABSTRACT

A recording medium has a first fringe pattern which is described by a first spectral bandwidth and a first image blur factor. The recording medium also has a second fringe pattern which is described by a second spectral bandwidth and a second image blur factor, the first spectral bandwidth being different from the second spectral bandwidth, and the first image blur factor being substantially equal to the second image blur factor. By providing multiple holograms in the single recording medium, the spectral bandwidths of each hologram are combined to provide an overall spectral bandwidth. Since the image blur factors of each hologram are substantially the same, i.e., overlap, when the two holograms are combined, the overall image blur factor is not increased. Indeed, it decreases at the same time the thickness of the recording medium is increased by a factor which is equivalent to the number of exposure in the single recording medium. The result is increased bandwidth without a concomitant increase in image blur.

10 Claims, 3 Drawing Sheets

ENHANCED-RESOLUTION, MULTIPLY-EXPOSED REFLECTION HOLOGRAM

BACKGROUND OF THE INVENTION

1. Field of the Invention

The present invention generally relates to holograms and, more specifically, to improved reflection holograms which exhibit minimal chromatic dispersion.

2. Description of Related Art

High quality holographic optical elements are used in diffraction optic display systems, such as head-up displays (HUDs), for advanced aircraft, helmet-mounted displays, laser protective devices, narrow band reflective filters, and holographic high gain screens for simulators. These are only a few of the many uses of high quality reflective holograms.

Of particular relevance to this invention are displays consisting of an image source used to reflect light off of a mirror hologram to an observer. Such displays include head-up displays, helmet mirror displays, and certain types of holographic virtual image displays. In the reflection holograms of such displays, there may still be a need for adjusting peak wavelength, and for maximizing peak efficiency and spectral bandwidth of the hologram. Moreover, it may be desirable to use a broad band source for hologram playback and also have the ability to move the hologram image farther away from the hologram plane.

In reflection holograms created by a single exposure using conventional methods, the image diffraction angle $\theta_i$, as defined in FIG. 1, is dependent upon wavelength $\lambda$ of the incident playback light and spatial frequency $f=1/\Lambda$ of the fringe pattern in the hologram. The image diffracted angle $\theta_i$ monotonically decreases with increasing wavelength, as is known. Furthermore, when illuminated by a beam having a range of wavelengths, the diffracted image rays cover a certain range of angles, which is sometimes hereinafter referred to as an image blur factor.

As can be appreciated, when it is desirable to increase the spectral bandwidth of the hologram, the image blur factor concurrently increases. Consequently the conventional method of making a reflection hologram has required a balancing between increasing spectral bandwidth and increasing image blur factor.

A need therefore exists in the art to provide an apparatus and method of making a reflection hologram that minimizes the image blur factor while maximizing the spectral bandwidth and, thus, maximizes the diffraction efficiency of the hologram.

SUMMARY OF THE INVENTION

Accordingly, an object of the present invention is to provide an improved reflection hologram and method of making the same.

Another object of the present invention is to maximize a spectral bandwidth for a hologram while minimizing image blur factor.

Yet another object of the present invention is to provide a multiply-exposed hologram whose diffraction efficiency is greater than or equal to a singly-exposed hologram.

The objects of the present invention are achieved by providing a recording medium having a first fringe pattern which is described by a first spectral bandwidth and a first image blur factor. The recording medium also has a second fringe pattern which is described by a second spectral bandwidth and a second image blur factor, the first spectral bandwidth being different from the second spectral bandwidth, and the first image blur factor being substantially equal to the second image blur factor.

By providing multiple holograms in the single recording medium, the spectral bandwidths of each hologram are combined to provide an overall spectral bandwidth. Since the image blur factor of each hologram is substantially the same, i.e., overlap, when the two holograms are combined, the overall image blur factor is not increased. Indeed, it decreases at the same time the thickness of the recording medium is increased by a factor which is equivalent to the number of exposures in the single recording medium. The result is increased bandwidth without a concomitant increase in image blur factor.

The above objects of the present invention, as well as others, can best be seen from an examination of the specification, claims, and drawings.

DESCRIPTION OF THE PREFERRED EMBODIMENTS

The following description is provided to enable any person skilled in the art to which the present invention pertains, or with which it is mostly nearly connected, to make and use the same, and sets forth the best mode contemplated by the inventor of carrying out his invention.

Figure 1:
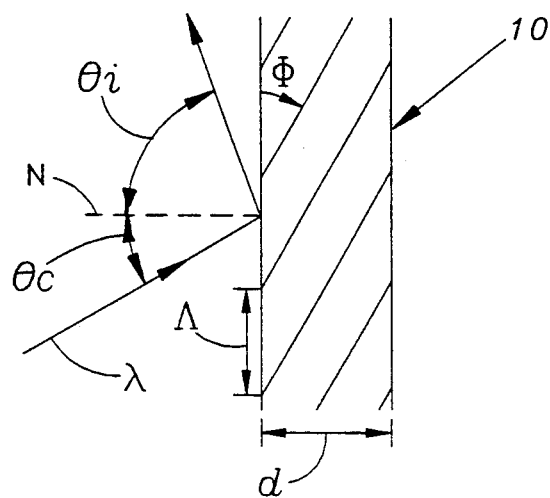
FIG. 1 diagrammatically shows a singly-exposed reflection hologram.

FIG. 1 diagrammatically shows a conventional reflection hologram 10 which is being illuminated by light having a wavelength $\lambda$. The hologram 10 includes a fringe pattern which is defined by a fringe slant $\Phi$ and a spatial frequency $\Lambda$. The hologram 10 also has a film thickness d.

Figure 2:
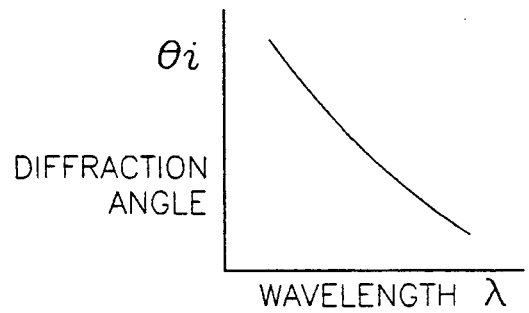
FIG. 2 is a graph of diffraction angle versus wavelength for the hologram in FIG. 1.
Figure 3:
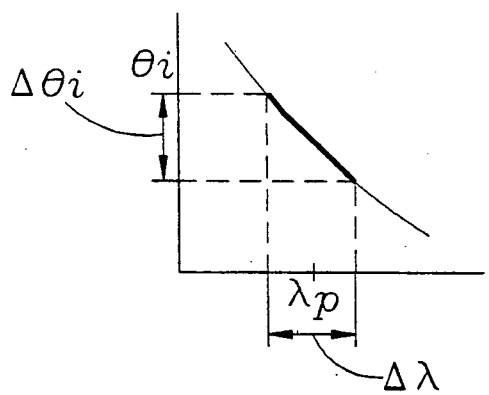
FIG. 3 is a graph of an image blur factor versus spectral bandwidth for the hologram in FIG. 1.

When viewed from FIG. 1, the incoming light $\lambda$ impinges the hologram 10 at an angle $\theta_c$ which is measured from a normal line N to the hologram 10. The light $\lambda$ then diffracts off hologram 10 at an angle denoted $\theta_i$, as measured from the normal line N. As is known and graphically shown in FIG. 2, the diffraction angle $\theta_i$ monotonically decreases with increasing wavelength. Referring to FIG. 3, it is also known that, over a particular spectral bandwidth $\Delta\lambda$ of incoming light (the wavelength band over which the hologram exhibits appreciable diffraction), there is a peak wavelength $\lambda_p$ where the hologram diffraction is at a maximum. However, the diffraction angle $\theta_i$ then covers a range of angles or, in other words, produces an image blur factor which can be denoted $\Delta\theta_i$. In FIG. 3, the heavier or darker portion of the plotted graph indicates the particular image blur for a hologram with the particular bandwidth $\Delta\lambda$. As can be appreciated, in a conventional reflection hologram 10, as the spectral bandwidth $\Delta\lambda$ increases, the image blur factor $\Delta\theta_i$ concurrently increases. The actual blur of the image seen by an observer is proportional to the image blur factor and increases as the distance of the image source to the hologram increases.

Moreover, with the above-described conventional hologram 10, if it is desirable to utilize a playback light source which is relatively broad band, then to diffract as much light as possible, the hologram must be broad band. $\Delta\lambda$ is large but the conflicting trade-off is that the image blur factor increases. Of course, in the conventional hologram 10, the image blur factor $\Delta\theta_i$ can be reduced but at the cost of reducing the spectral bandwidth $\Delta\lambda$ and consequent image brightness. Thus, an object of the present invention is to reduce the image blur factor $\Delta\theta_i$, or at least hold it to a minimum, while keeping the spectral bandwidth $\Delta\lambda$ at a maximum and thereby the total diffracted light at a maximum.

Figure 4:
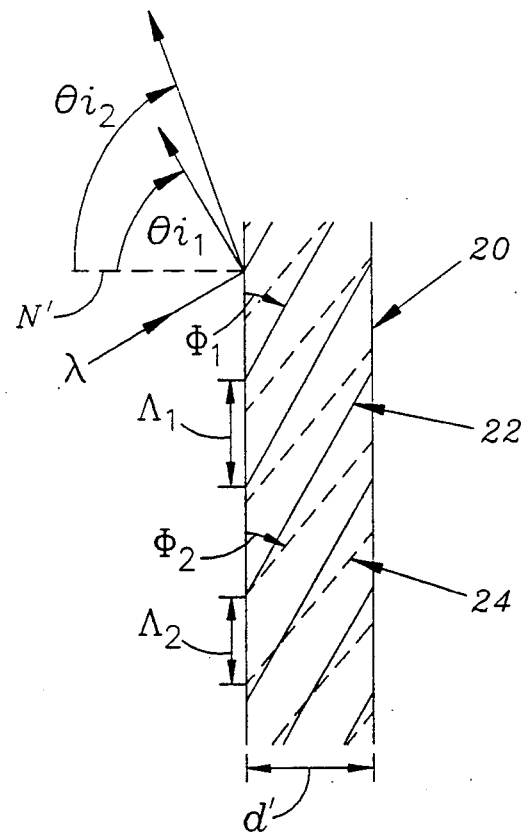
FIG. 4 depicts a doubly-exposed recording film according to the present invention.

According to the present invention, in the particular embodiment shown in FIG. 4, a recording film 20 includes a first hologram 22 and a second hologram 24. The first hologram 22 is shown by the solid lines and is characterized by a fringe slant $\Phi_1$ and a fringe spacing $\Lambda_1$. The second hologram 24 is shown by the dashed lines and is similarly characterized by a fringe slant $\Phi_2$ and a fringe spacing $\Lambda_2$. The recording film has a thickness of d'. With a wavelength of light $\lambda$ impinging the recording film 20, the characteristic image blur angle for the two holograms is respectively denoted $\theta_{i1}$, $\theta_{i2}$, as measured from a normal line N'.

Figure 5:
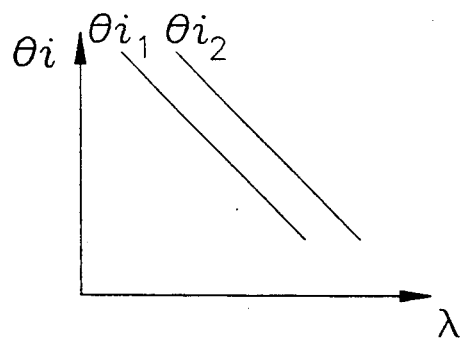
FIG. 5 is a graph of diffraction angle versus wavelength for a doubly-exposed hologram.
Figure 6:
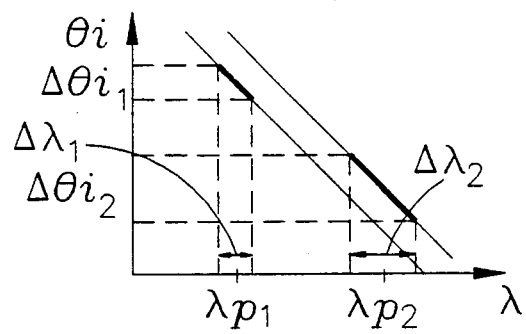
FIG. 6 is a graph of image blur factors versus spectral bandwidth for a doubly-exposed hologram.

With a doubly-exposed recording film, the characteristic graph of diffraction angle or image blur factor versus wavelength can be shown, as in FIGS. 5 or 6, for example. In FIG. 5, the graph depicts a recording film which has been doubly-exposed in a general fashion, but does not indicate any limits in wavelength over which either of the holograms appreciably diffract. One hologram is denoted $\theta_{i1}$ and the other hologram $\theta_{i2}$. FIG. 6 graphically shows a doubly-exposed film which has been exposed in a general fashion, but not with a view towards avoiding an increase in image blur in accordance with the present invention. The result is a doubly-exposed hologram film which exhibits increased image blur over a singly-exposed film. The first hologram has a characteristic spectral bandwidth $\Delta\lambda_1$ with a peak wavelength at $\lambda_{p1}$. Likewise, the second hologram has a characteristic spectral bandwidth of $\Delta\lambda_2$ with a peak wavelength at $\lambda_{p2}$. In the example of FIG. 6, it can be seen from the darker or heavier portions of the two plotted graphs that the image blur factors do not overlap, nor do the bandwidths overlap. The two holograms thus provide in combination a greater spectral bandwidth than either of the holograms alone. However, the image blur factor is compounded in the sense that the image blur factor $\theta_{i1}$ covers a range which is separate from the image blur $\theta_{i2}$ of the second hologram.

Figure 9:
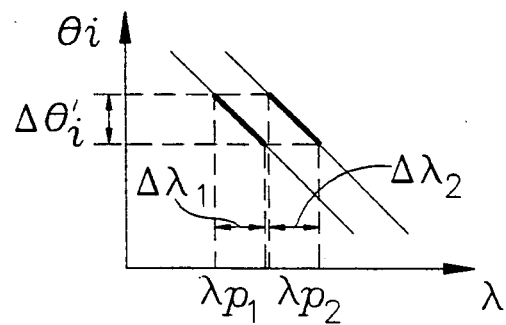
FIG. 9 is a graph of image blur factor versus spectral bandwidth for a doubly-exposed hologram according to the present invention.

As is known in the art, the holograms 22, 24 can be constructed in such a way that while the spectral bandwidths do not overlap, the image blur factors do overlap, as shown in FIG. 9. For a general discussion on manipulation of the spectral bandwidth and image blur, see, for example, Caulfield, *Handbook of Optical Holography*, Chapter 10 (1979); Collier, *Optical Holography*, Chapter 9 (1971), both of which are incorporated herein by reference. As set forth in the prior art and as used in these references, "spectral bandwidth" may be defined as the wavelength range over which the diffraction efficiency of a halogram is at least 5% of its peak diffraction efficiency; and "blur factor" may be defined as the range of diffracted angles of rays whose wavelengths fall within the spectral bandwidth of the hologram. According to the present invention, like that shown in FIG. 6, the two holograms have different spectral bandwidths $\Delta\lambda_1$, $\Delta\lambda_2$, with different peak wavelengths $\lambda_{p1}$, $\lambda_{p2}$. However, unlike that depicted in FIG. 6, the present invention provides an overlapping or overall image blur factor for the two holograms which is denoted $\Delta\theta_i'$.

Figure 7:
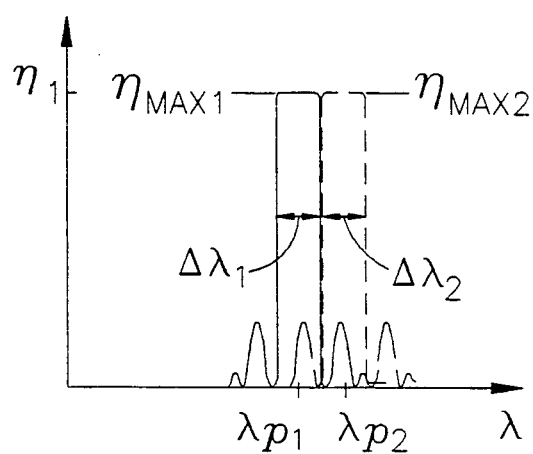
FIG. 7 is a graph of diffraction efficiency versus wavelength for two holograms of a doubly-exposed hologram considered separately.
Figure 8:
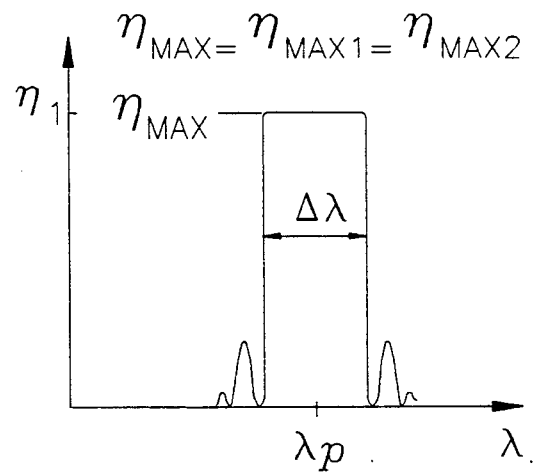
FIG. 8 is a graph of diffraction efficiency versus wavelength for a doubly-exposed hologram.

In referring to FIG. 7, in accordance with this particular embodiment, when considered separately, the two holograms have, in addition to their spectral bandwidths and peak wavelengths, maximum diffraction efficiencies $\eta_{max1}$, $\eta_{max2}$, respectively. The combined effect of the two holograms provides a single peak wavelength $\lambda_p$, an overall spectral bandwidth $\Delta 2$ and, finally, an overall diffraction efficiency $\eta_{max}$, as shown in FIG. 8.

To achieve the effect of reducing the image blur factor, the thickness d' of the recording film 20 must be doubled. By making the holograms 22, 24 with sharp, well-defined reflection bands in the diffraction efficiency versus wavelength graph for example, as shown in FIG. 7, the cross-talk be the two holograms is minimized, as is known in the art. In general, for reflection holograms, the spectral bandwidth $\Delta\lambda$ is proportional to the index modulation $\Delta n$ of the DCG (dichromated gelatin) film. The peak efficiency $\eta_{max}$ is dependent on the product of thickness and index modulation $d \cdot \Delta n$ "Index Modulation" ($\Delta n$) refers to the magnitude of modulation, i.e. variation, of the refractive index of the hologram throughout its thickness. The terms $\Delta n_1$ and $\Delta n_2$ refer to the modulation indexes of first and second holograms. In FIG. 7, $\Delta\lambda_1 = \Delta\lambda_2 = \Delta\lambda/2$ is achieved with $\Delta n_1 = \Delta n_2 = \Delta n/2$. Therefore, to keep $d \cdot \Delta n$ and $\eta_{max}$ constant, $d_1 = d_2 = 2d$. Accordingly, by double exposing the recording film 20 as described above, and by doubling the film thickness, the efficiency spectrum has remained the same but the image blur factor has been reduced by a factor of 2. In the particular embodiment shown in FIG. 9, the image blur factor $\Delta\theta_i'$ is equal to one-half of $\Delta\theta_i$ described in FIG. 3. For example, if a 7-micron-thick reflection hologram has a $\lambda_p$ equal to 550 nanometers, a $\Delta\lambda$ equal to 20 nanometers, and an image blur of 2 microrads, by increasing the film thickness to 14 microns, and double exposing the film, the image blur can be reduced to 1 microrad.

The above double exposure method can be extended to n number of exposures while increasing the thickness of the film by the number of exposures. As a practical limitation, however, a maximum thickness of less than about 50 microns will be found for the current state of the art.

Figure 10:
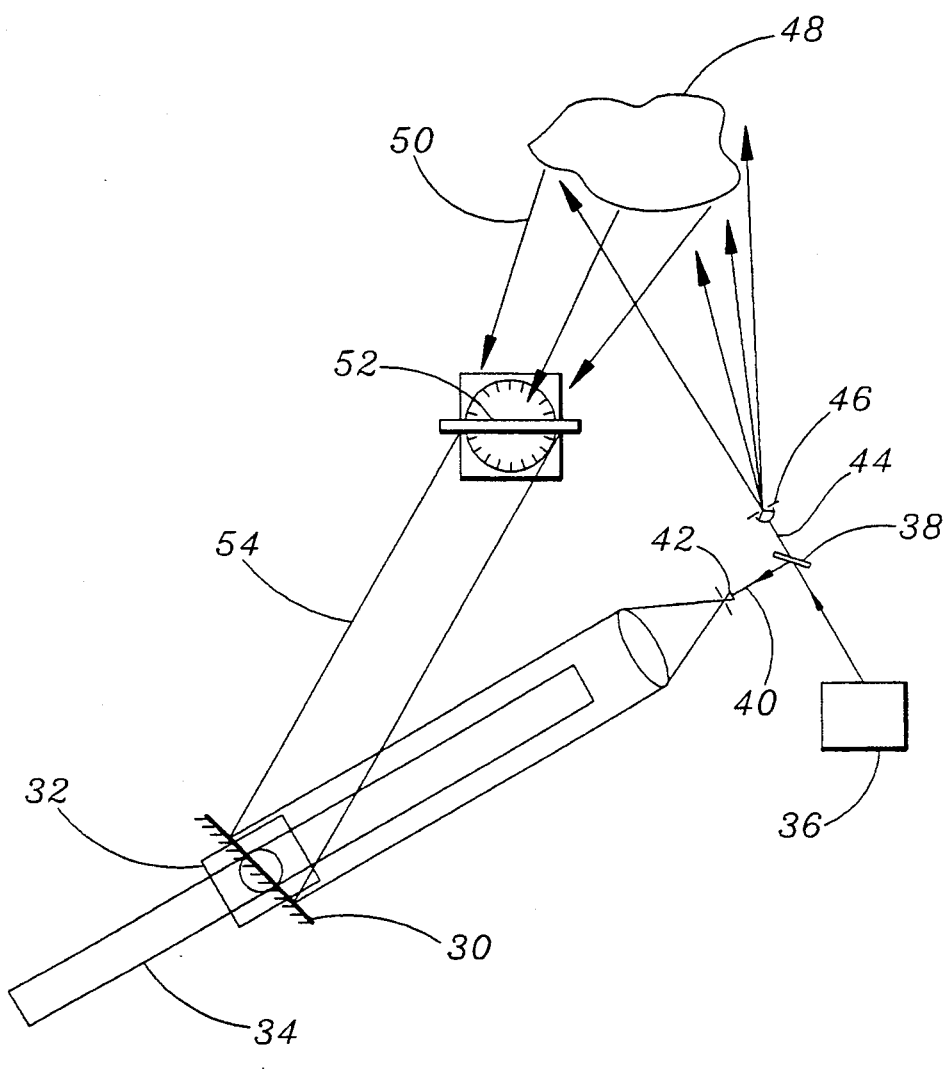
FIG. 10 diagrammatically illustrates an apparatus for multiply exposing a hologram according to the present invention.

FIG. 10 depicts one method of multiply exposing a reflection hologram. A rotatable mirror 30 is mounted on a mirror mount 32 which can translate along an optical rail 34. A light source 36 produces a beam to a beam splitter 38. The beam splitter produces a split beam 40 which passes through a collimating lens 42 and onto the mirror 30. Another split beam 44 passes through a stop 46 and then impinges an object 48. An object beam 50 is thereby produced to impinge a rotatable holographic plate 52. A reference beam 54 comes from the mirror 30 to interfere with the object beam 50 in the plate 52. By rotating the plate 52 and/or the mirror 30, as well as translating the mount 32, different holograms can be made in the plate 52.

The above only provides specific embodiments of the present invention, and it is contemplated that various modifications to the above can be made but which nevertheless come within the scope of the present invention as defined in the claims.

What is claimed is:

1. A reflection hologram comprising:
    a recording medium;
    a first fringe pattern formed in said recording medium and having a first spectral bandwidth and a first image blur factor; and
    a second fringe pattern formed in said recording medium in the same region of said medium as said first fringe pattern, said second fringe pattern having a second spectral bandwidth and a second image blur factor, said first spectral bandwidth being different from said second spectral bandwidth, said first image blur factor being substantially equal to said second image blur factor.

2. The hologram according to claim 1 wherein said hologram has an overall spectral bandwidth which is a combination of said first and second spectral bandwidths.

3. The hologram according to claim 1 wherein said first and second fringe patterns have different fringe spacings and different fringe slants.

4. The hologram according to claim 1 wherein said first and second fringe patterns have a first index modulation and a second index modulation, respectively, said first index modulation being different from said second index modulation.

5. A method of making a reflection hologram comprising the steps of:
    multiply exposing a recording film a number of times to produce a number of exposures therein; and
    producing a plurality of holograms in said film, each said hologram having a spectral bandwidth which does not overlap with the spectral bandwidth of any other of the said plurality of holograms, each said hologram having an image blur factor, the image blur factor of each of said holograms being substantially equal.

6. The method according to claim 5 further including the step of increasing the thickness of said recording film in proportion to the number of said exposures.

7. The method according to claim 5 further including the step of varying the fringe slant, fringe spacing, and index modulation associated with each of said plurality of holograms.

8. A method of reducing an angular blur factor in a reflection hologram while maximizing spectral bandwidth and diffraction efficiency, comprising the steps of:
    adjusting a recording film thickness based on a selected number of multiple exposures to be performed;
    multiply exposing said film by said selected number of exposures to produce a plurality of holograms therein, each of said plurality of holograms having a spectral bandwidth which does not overlap with the spectral bandwidth of any of the other of said plurality of holograms and each of said plurality of holograms having substantially the same image blur factor.

9. The method according to claim 8 wherein the step of multiply exposing includes the step of creating holograms with different fringe patterns.

10. The method according to claim 8 wherein the step of multiply exposing includes the step of adjusting the fringe slant and the index modulation of each hologram such that they are different from one another.

* * * * *